United States Patent [19]
Ozaki et al.

[11] Patent Number: 6,121,370
[45] Date of Patent: *Sep. 19, 2000

[54] COLOR RECORDING LIQUIDS, CARTRIDGES, RECORDING METHODS AND DEVICES

[75] Inventors: Mitsuo Ozaki; Shigeharu Suzuki; Shino Tokuyo; Hiroo Ueda, all of Kawasaki, Japan

[73] Assignee: Fujitsu Limited, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/948,063

[22] Filed: Oct. 9, 1997

[30] Foreign Application Priority Data

Mar. 11, 1997 [JP] Japan .................................. 9-056501

[51] Int. Cl.⁷ .................... C09D 11/10; C09D 167/02; C08L 67/02
[52] U.S. Cl. ..................... 524/501; 523/160; 524/601; 524/603
[58] Field of Search .................... 523/160, 161; 106/31.27, 31.28, 31.6, 31.9; 524/603, 501, 601

[56] References Cited

U.S. PATENT DOCUMENTS

| | | | |
|---|---|---|---|
| 5,006,598 | 4/1991 | Adams et al. | 106/31.6 |
| 5,730,790 | 3/1998 | Rehman | 106/31.28 |

FOREIGN PATENT DOCUMENTS

| | | |
|---|---|---|
| 0 588 316 | 3/1994 | European Pat. Off. . |
| 0 603 898 | 6/1994 | European Pat. Off. . |
| 0 675 178 | 10/1995 | European Pat. Off. . |
| 0 692 527 | 1/1996 | European Pat. Off. . |
| 56-58871 | 5/1981 | Japan . |
| 64-58583 | 3/1989 | Japan . |
| 1-141085 | 6/1989 | Japan . |
| 3-167271 | 7/1991 | Japan . |
| 3-167272 | 7/1991 | Japan . |
| 4-147866 | 5/1992 | Japan . |
| 5-208548 | 8/1993 | Japan . |
| 6-191143 | 7/1994 | Japan . |
| 7-1837 | 1/1995 | Japan . |
| 8-72232 | 3/1996 | Japan . |
| 8-72260 | 3/1996 | Japan . |

OTHER PUBLICATIONS

Patent Abstracts of Japan, vol. 16, No. 434, Sep. 10, 1992.

*Primary Examiner*—Peter A. Szekely
*Attorney, Agent, or Firm*—Armstrong, Westerman, Hattori, McLeland & Naughton

[57] ABSTRACT

Color recording liquid which comprises, in combination, (a) an aqueous, black-colored recording liquid and (b) at least one aqueous, colored recording liquid which has other hue than black, in which said liquid (b), when applied to a recording medium, can be fixed in said recording medium within a shorter time than the time required when said liquid (a) is fixed in the same recording medium, and either or both of said liquid (a) and said liquid (b) are a recording liquid which comprises water having dispersed therein a coloring material consisting of particles of colored, ionic group-containing resin. Using the color recording liquid, it becomes possible to obtain high quality black recording without causing blurring of color, along with high quality color recording having no bleeding of color in a borderline between two adjacent color recording areas of different hues.

3 Claims, 3 Drawing Sheets

COLOR RECORDING LIQUIDS, CARTRIDGES, RECORDING METHODS AND DEVICES

BACKGROUND OF THE INVENTION

1. Field of the Invention

The present invention relates to a color recording liquid which can be advantageously used as a coloring ink, color developer and others in an ink jet color recording, electrographic color recording and other recording or imaging systems. Using the color recording liquid according to the present invention, it becomes possible to obtain high quality black recording without causing blurring of color, along with high quality color recording having no bleeding of color in a borderline between two adjacent color recording areas of different hues. In addition to these advantages, according to the present invention, the resulting color recording can exhibit an excellent water resistance and lightfastness, good brightness and wide range of color reproduction. The present invention also relates to a cartridge containing the color recording liquid of the present invention in its containers, and a color recording method and device using the color recording liquid of the present invention. The term "recording liquid" is used herein to generally indicate an ink composition for use in color recording and therefore it is also referred to as an ink, however, it should be noted that the recording liquid or ink can be used as a developer in an electrographic color recording process and other uses, in addition to its use as a coloring ink in an ink jet color recording process.

2. Description of the Related Art

When recording or printing of images including characters, pictures and others in color (hereinafter, referred briefly to as "color recording") is done by using color recording liquids such as inks in accordance with an ink jet recording process or an electrographic recording process, so-called "bleeding of color" is frequently caused due to undesirable mixing of different color inks at a border between two adjacent color recording areas. Since the bleeding of color can deteriorate qualities of the resulting color recording, hitherto, the following methods have been suggested to solve the bleeding problem.

1) combined use of two inks which are insoluble in each other,
2) use of a coloring material-providing ink which can release a coloring material as a result of the reaction, and
3) improving a penetration of the ink into the recording medium, thereby accelerating a fixation of the ink to the medium.

More particularly, the first method directed to combined use of two inks is disclosed in Japanese Unexamined Patent Publication (Kokai) No. 56-58871. The multicolor ink spraying apparatus disclosed therein is characterized by using a plurality of inks each of which contains as a solvent of the ink at least two types of liquids which are insoluble in each other. Using this method, it becomes possible to use an aqueous ink containing water, alcohols and others as a solvent (for example, red ink) and an oil-based ink containing liquid-like hydrocarbons as a solvent (for example, black ink) in an adjacent relationship on the same recording paper. Mixing of the colors can be effectively avoided, because the aqueous ink and the oil-based ink cannot be mixed due to their incompatibility.

The second method directed to use of coloring material-providing ink is disclosed in Japanese Unexamined Patent Publication (Kokai) No. 64-58583. The ink jet recording method disclosed therein is characterized by using four colors of inks including yellow, magenta and cyan and, if necessary, black, and also blending two types of inks (acid dye and basic dye) for each color in order to produce an insolubilized dye in a borderline between the two different color areas on the recording paper. According to this method, a drying capability in the color mixing areas of the recorded images can be improved, and also a satisfactory resolution and sharpness can be given to the images.

Formation of the insolubilized dye is also well-known from other patent publications. For example, Japanese Unexamined Patent Publication (Kokai) No. 1-14108 teaches the process which comprises previously adhering an anionic compound-containing liquid onto a recording medium, followed by adhering an ink containing a basic group-containing dye, or Japanese Unexamined Patent Publication (Kokai) Nos. 5-208548, 7-1837, 8-72260 and 8-72232 each teaches use, in combination, of an ink containing a dye capable of being deposited upon variation of pH value and other factors and another ink or processing solution which can change a pH value and the like, thereby causing deposition and thus insolubilization of the dye in said ink, and bring the former ink in contact with the latter ink or processing solution, thereby depositing the insolubilized dye.

The second method is also disclosed in Japanese Unexamined Patent Publication (Kokai) No. 6-191143. The ink jet color recording method disclosed therein is directed to formation of color images on a recording material by using color inks of at least four colors, and is characterized by using the following color inks (1) to (4):

(1) yellow ink containing an anionic dye and a nonionic surfactant;
(2) magenta dye containing an anionic dye and a nonionic surfactant;
(3) cyan dye containing an anionic dye and a nonionic surfactant; and
(4) color ink containing a cationic dye and capable of providing a black color upon mixing with any one of the color inks (1) to (3) on the recording material, and mixing the color ink (4) with at least one color ink selected from the color inks (1) to (3). Using this method, even if the recording material used is a conventional plain paper, bleeding of different color dyes can be prevented in a borderline area of the colors in the plain paper, and also high quality color images having a good and uniform color density can be produced. At the same time, according to this method, the qualities of black color characters can be notable improved, and mixing of the black color with other colors can be avoided at their color borders. Namely, black color characters and color images having high qualities can be obtained. Note, however, that in the above-mentioned method, formation of the black images relies upon a black color, i.e., so-called "composite black", obtained by mixing (repeatedly recording or applying) the color inks, as is recited in the appended claims of Japanese Kokai 6-191143.

The third method is directed to an improvement of the penetration of the ink into the recording medium, and it can effectively prevent bleeding of color as a function of the shortened time of the fixation, because the inks used herein can rapidly penetrate and be absorbed in the recording medium before diffusion and mixing of different color inks are caused at their color borders, thereby ensuring an accelerated fixation of the inks.

However, the above-described first, second and third methods suffer from many problems to be solved.

For example, since it uses an oil-based ink as one ink, the first method suffers from poor handling property and is a fire hazard. Further, because they require the specific characteristics for the dyes used in the preparation of the inks, the first and second methods have a problem that the range of suitable dyes and the like for the preparation of the inks is restricted to a very narrow range, in other words, although it is desired to select the dyes capable of simultaneously satisfying a good tone of color, high weathering resistance and high reliability, it is very difficult to select such dyes. Furthermore, because two types of the inks are generally used in these methods, if there arises the necessity of using three or more types of the dyes in the preparation of the inks, some combination of the selected dyes cannot be utilized in carrying out the methods because of the poor characteristics of some of said dyes, or alternatively, it becomes necessary to use an additional and expensive solutions and means such as specific processing solutions for the inks, tanks for receiving the processing solutions, recording nozzles for spraying the processing solutions, and driving circuits and other devices for controlling the spraying of the processing solutions.

Due to the improved penetration of the inks, the third method has a tendency of causing blurring of the dyes along a length of the fibers and the like in the recording medium, when papers having an uneven surface due to exposed cellulose fibers, namely, so-called "plain papers" are used as the recording medium. Such-blurring of the dyes can result in a problem that unsharp edges are produced in the recorded images, and this problem is particularly important when the image recording is carried out by using a black ink, because an excellent sharpness is particularly required in such black image recording. Nevertheless, the third method is considered to be the most suitable one for the practical use among the described three methods, because it can notably diminish blurring of colors in the color recording using cyan, magenta and yellow inks to an acceptably reduced level.

In order to solve the above-mentioned problem concerning formation of the unsharp edges in the recorded images due to characteristics of the used black color ink, it is contemplated, as disclosed in Japanese Unexamined Patent Publication (Kokai) No. 4-147866, to use, in combination, a specific black color ink requiring an extended fixation time, thereby ensuring retarded penetration of the ink into the papers and thus inhibition of the blurring of the inks, and specific color inks having other hues than the black which can be fixed in the papers within a shorter time than the black color ink, the fixing time being sufficiently short to avoid the blurring of the inks. Accordingly, the application of the method described in Japanese Kokai 4-147866 to the above-described third method is effective to simultaneously attain black recording with high qualities having no blurring and color recording with high qualities having no bleeding of colors.

However, in the above combination of the third method and the method described in Japanese Kokai 4-147866, there remains one problem that it is still insufficient to prevent bleeding of colors in the borderline of black and other colors. To solve this problem, the prior art methods suggest the following countermeasures:

(A) providing a non-recording area in the borderline between the black recording area and the other color recording area, thereby avoiding contact of said two colors; and (B) repeatedly recording two or more types of color inks (for example, yellow, magenta, cyan) in the borderline area to thereby record a composite black having a hue which is the closest to a black, i.e., so-called "real black". These countermeasures are considered to be noticeable, however, the countermeasure (A) is insufficient to remove a remarkable whitening (formation of the white-colored area) due to presence of the non-recording area, and the countermeasure (B) causes a new problem, i.e., deterioration in the qualities of the resulting recording, due to differences in the black hue between the borderline area (composite black) and the other areas (real black owing to the black ink).

In addition to the above-discussed problems, there is a further problem concerning the difficulty in obtaining glossy recording. Hitherto, an aqueous ink has been conventional used as the jet ink, however, such an aqueous ink is unable to confer a gloss to a surface of the resulting recording. Contrary to this, particularly in the field of color recording, there has been desired to give a good gloss to the recording surface, thereby improving a visual brightness and thus obtaining high quality recording products comparable to gravure printing products. To solve this problem, one prior art method suggests use of specifically produced glossy recording papers for exclusive use in color ink jet printers, thereby obtaining a desired level of gloss. Another method is disclosed in, for example, Japanese Unexamined Patent Publication (Kokai) Nos. 3-167271 and 3-167272, and it suggests use of resinous particles as a fixing means of the coloring materials and selection of specific solvents satisfying a certain degree of the penetration into the recording medium and a certain degree of the evaporation, thereby enabling color recording with gloss. However, since the former method has a drawback that the recording papers for exclusive use are very expensive, it is desired to enable glossy recording with use of plain papers which are easily available at low costs and therefore are conventionally used in dry process copying machines. Further, the latter method has a drawback that the desired coloring effects could not be obtained, because the coloring material, particularly dyes are still dispersed in an aqueous medium, although it should be adhered to the resinous particles as a fixing means. Furthermore, in view of obtaining a high and satisfactory coloring or color development, the coloring material used should be dispersed in the aqueous medium as uniformly as possible, however, the latter method results in drawbacks such as reduction of the chroma and deterioration of the color developing performance due to insufficient dyeing of the resinous particles.

SUMMARY OF THE INVENTION

One object of the present invention is to provide an improved color recording liquid which can be easily handled, produces no fire hazard, can freely use suitable coloring materials such as dyes, pigments and the like from a wide variety of coloring materials in the preparation of the recording liquids or inks, can provide high quality and glossy color recording on plain papers, can provide sharp recordings having no blurring of color in both of the black recording and color recording, enables faithful reproduction of black color, i.e., formation of so-called "real black", and does not cause bleeding of the color at the border between the black area and the color area.

Another object of the present invention is to provide an improved cartridge containing the color recording liquid of the present invention in its containers.

Further, another object of the present invention is to provide an improved color recording method using the color recording liquid of the present invention.

Furthermore, another object of the present invention is to provide an improved color recording device using the color recording liquid of the present invention.

The other objects of the present invention will be appreciated from the descriptions as set forth below with regard to the preferred embodiments thereof.

According to one aspect of the present invention, the above object can be attained by a recording liquid for use in color recording which comprised, in combination, (a) and aqueous, black-colored recording liquid and (b) at least one aqueous, colored recording liquid which has a hue other than black, in which said colored recording liquid (b), when applied to a recording medium, can be fixed in said recording medium within a shorter time than the time required when said black-colored recording liquid (a) is fixed in the same recording medium, and either or both of said black-colored recording liquid (a) and said colored recording liquid (b) are a recording liquid which comprises water having dispersed therein a coloring material consisting of particles of colored, ionic group-containing resin and, when said coloring material-dispersed recording liquid is used as a first recording liquid along with another recording liquid, said another recording liquid is a second recording liquid which comprises water having dispersed and/or dissolved therein a coloring material consisting of an ionic group-containing compound whose ionic group has an opposite ionic character to that of the ionic group of said ionic group-containing resin.

According to another aspect of the present invention, the above object can be attained by a cartridge containing recording liquids, which comprises, in combination, separate containers, each of which contains the black-colored recording liquid (a)-and the colored recording liquid (b), separately, of the color recording liquids of the present invention.

According to still another aspect of the present invention, the above object can be attained by a method of conducting color recording on a recording medium which comprises the step of applying the color recording liquids of the present invention to said recording medium in accordance with the desired recording pattern.

According to still another aspect of the present invention, the above object can be attained by a device for conducting color recording on a recording medium which comprises (i) a cartridge containing recording liquids which comprises, in combination, separate containers, each of which contains the black-colored recording liquid (a) and the colored recording liquid (b), separately, of the present invention; and (ii) a means for applying each of the recording liquids supplied from said containers to said recording medium in accordance with the desired recording pattern.

BRIEF DESCRIPTION OF THE DRAWINGS

The present invention will be more clearly understood from the description as set forth below with reference to the accompanying drawings, wherein.

DESCRIPTION OF THE PREFERRED EMBODIMENTS

The color recording liquids, recording liquid cartridges, color recording methods and color recording devices according to the present invention will be further described with reference to preferred embodiments of the present invention. Note, however, that the present invention should not be limited to the described embodiments.

In the first aspect thereof, the present invention resides in a recording liquid for use in color recording and the color recording liquid is characterized by using, in combination, (a) an aqueous, black-colored recording liquid for black recording and (b) at least one aqueous recording liquid for recording colors other than black (hereinafter, the recording liquid is also referred to as a "colored recording liquid" to shorten the description). The colored recording liquid of the present invention is further characterized in that:

the colored recording liquid (b), when applied to a recording medium, can be fixed in the recording medium within a shorter time than the time required when the black-colored recording liquid (a) is fixed in the same recording medium, at least one, namely, either or both of the black-colored recording liquid (a) and the colored recording liquid (b) is/are a recording liquid which comprises water having dispersed therein a coloring material consisting of particles of colored, ionic group-containing resin and, when the coloring material-dispersed recording liquid is used as a first recording liquid along with another recording liquid which will be referred to as a second recording liquid in order to distinguish from the first recording liquid, the second recording liquid comprises water having dispersed and/or dissolved therein a coloring material consisting of an ionic group-containing compound whose ionic group has an opposite ionic character to that of the ionic group of the ionic group-containing resin used in the first recording liquid.

In the color recording liquid according to the present invention, the coloring material-providing, ionic group-containing resin used in the constitution of at least one group of the aqueous recording liquid, i.e., first aqueous recording liquid, may be selected from a wide variety of natural occurring or synthetic resins, and suitable ionic group-containing resin includes, but is not restricted to, a polyester resin containing an ionic group in a molecule thereof.

The polyester resin used as the ionic group-containing resin, as is well-known in the field of polymer chemistry, consists essentially of polyhydric carboxylic acids and polyhydric alcohols. Preferably, the ionic group to be introduced into the polyester includes, for example, mono- or dicarboxylic acids containing an alkali metal salt of sulfonic acid or an ammonium salt of sulfonic acid and the like. Note that the ionic group-containing polyester resin and its preparation are described in detail in, for example, Japanese Unexamined Patent Publication (Kokai) Nos. 4-296321 and 7-196965 which will be described herein for reference.

The ionic group-containing resin can be processed in accordance with any conventional method and preferably by using a coloring agent to obtain a desired coloring material. Suitable coloring agents include, but are not restricted to, "dyes which are insoluble in water at an ordinary temperature" such as disperse dyes or oil-soluble dyes and organic pigments. These coloring agents may be used alone or as a mixture of two or more agents.

If desired, the first recording liquid may contain any additive, and suitable additives include, for example, agents for controlling physical properties, antibacterial agents, antifungicidal agents and others. Note that the above-mentioned coloring agents and additives as well as the recording liquid and its preparation, commonly applicable to both of the first and second coloring liquids of the present invention, are described in detail in, for example, the above-cited Japanese Kokai 7-196965.

The first recording liquid is preferably applied to the recording medium in an amount sufficient to provide a liquid layer thickness of at least 4.5 $\mu$m on the recording medium. The "liquid layer thickness" used herein means an average particle thickness calculated from an average particle diameter of the particles in the recording liquid as well as a number of the particles contained and an application area of the recording liquid.

As described above, in the first recording liquid, the ionic group-containing resin may be preferably colored with a dye, a pigment or a mixture of the dye and pigment. Similarly, in the second recording liquid used in combination with the first recording liquid, coloring may be preferably carried out by using a dye, a pigment or a mixture of the dye and pigment as a coloring agent. Namely, in the second recording liquid, the coloring material consisting of an ionic group-containing compound is preferably any one of a dye, a pigment, and resin particles colored with a dye, those colored with a pigment and those colored with a mixture of a dye and a pigment.

Further, as in the first recording liquid, coloring or formation of the coloring material used in the second recording liquid may be preferably carried out by using any coloring agent such as "dyes which are insoluble in water at an ordinary temperature", for example, dispersed dyes and oil-soluble dyes, and organic pigments and other dyes or pigments which are conventionally used in the preparation of the ink jet inks. However, for the second recording liquid, it is necessary that the colored compounds and preferably colored resin particles constituting the coloring material contain an ionic group having an opposite ionic character to that of the ionic group of the ionic group-containing resin, and they are dispersed and/or dissolved in water to obtain a second recording liquid. Of course, as in the first recording liquid, the second recording liquid may further contain any additives such as agents for controlling physical properties, antibacterial agents and antifungicidal agents.

In one preferred embodiment of the present invention, the first recording liquid is used in combination with the second recording liquid having a black hue. Preferably, the first recording liquid comprises three types of aqueous colored recording liquids, each of which is designed to make a cyan, magenta or yellow color, respectively.

In the practice of the present invention, any conventional recording materials such as naturally occurring or synthetic materials, for example, three-dimensional articles, sheets of fabrics or non-woven fabrics, resin-coated papers, plain papers and others may be used as the recording medium. For the present invention, however, in order to fully obtain the remarkable functions and effects by virtue of using the specific recording liquids, it is preferred to use plain papers as the recording medium. The plain papers, as described above, are the conventional recording papers, used in dry process copying machines and other printers, and therefore are easily available. Of course, other materials may be used as the recording medium, if desired.

The color recording liquid according to the present invention can be advantageously utilized in various types of color imaging, printing or recording systems. Typical examples of suitable systems to which the present invention can be applied include, but are not restricted to, a color ink jet recording system based on a piezoelectric process, a bubble jet process and the like, a color photographic recording system based on an electrographic or electrophotographic process and other systems. Namely, the color recording liquid can be used as an ink in the ink jet recording system, or it can be used as a developer in the electrographic recording system. Particularly, the piezoelectric ink jet recording system is more preferred, because it has no problem concerning deformation or other defects of the used resin particles due to application of heat.

As will be appreciated from the above descriptions, for the present invention, in order to obtain a monochromatic or black recording having good qualities without causing color blurring, a specific black-colored recording liquid or briefly black ink showing less penetration into the recording medium and thus requiring an extended time of fixation is used, and at the same time, in order to prevent bleeding of color at a border between two adjacent color areas, color inks having a relatively short fixation time are selectively used.

At the same time, in order to prevent bleeding of color at a color border between the black ink-recording area and the adjacent color ink-recording area, at least one of the black ink and the color inks is constituted as an ink which contains as a coloring material particles of ionic group-containing resin such as polyester resin colored with a dye, pigment and other coloring agents, while the remaining ink is constituted as an ink which contains as a coloring material a colored ionic group-containing compound whose ionic group has an opposite ionic character to that of the ionic group of the ionic group-containing resin. In addition to this notable advantage, such proper use of the black and color inks according to the present invention enables free selection of suitable coloring material for use in the color inks from a wide variety of coloring materials, improves color reproduction in the resulting color recording along with an improvement of the lightfastness and water resistance, and for the black ink recording, it enables easy production of high quality monochromatic recording having no blurring.

In other words, according to the present invention, since one coloring material consisting of particles of the ionic group-containing resin such as polyester resin is contacted and reacted with another coloring material having an opposite ionic group, they are precipitated and agglomerated in the recording areas so that color bleeding can be prevented in a color border between the black ink-recorded area and the color ink-recorded area. Further, since the black ink used hardly penetrates into the recording medium and thus its fixation is continued for a relatively long time, high quality monochromatic black recording can be accomplished. Furthermore, since the polyester resin which can be colored with a wide variety of dyes and pigments is preferably used as a base material of the coloring material, a range of the selection in the coloring material can be extended, and thus color inks showing a widened range of the color reproduction can be prepared and used. Moreover, since the polyester resin used as the base material is insoluble in water, water resistance can be increased in the resulting color recording, and also, since the polyester resin shows a high absorption of ultraviolet radiations, an increased lightfastness can be obtained in the coloring material with the polyester coating.

Furthermore, according to the present invention, since the colored resin particles having a film forming capability are applied as a thin film on the recording medium, it becomes possible to accomplish color recording with a high chroma and a good color development. Such thin film is also effective in increasing the smoothness of the recording surface and also gives a high gloss to the recording surface.

In the second aspect thereof, the present invention resides in a cartridge containing recording liquids, characterized by comprising, in combination, discrete or separate containers, each of which contains the color recording liquid of the present invention having a different hue from each other. The containers used in the cartridge may be any desired configuration and size depending upon the recording devices to which the cartridge is installed. It is also desirable that the cartridge can be removably installed in the recording devices with an easy operation.

In the third aspect thereof, the present invention resides in a method of conducting color recording on a recording medium, and is characterized by applying the color recording liquid of the present invention to the recording medium in accordance with the desired recording pattern.

In the color recording method of the present invention, when the above-described first recording liquid is applied onto the recording medium, it is preferred that the recording liquid is applied at a liquid layer thickness of about 4.5 $\mu$m. The liquid layer thickness of about 4.5 $\mu$m can be obtained by using different methods, however, preferably, such layer thickness can be obtained by a single recording operation in which a sum of the first recording liquid necessary to obtain the described thickness is applied to the recording medium through one application step, or by a multiple recording operation in which the first recording liquid necessary to obtain the described thickness is divided into several portions and is portionwise applied to the recording medium. Further, when the first recording liquid is used in combination with the second recording liquid to conduct the color recording, it is preferred that black recording is carried out by using the second recording liquid, and color recording is carried out by using three first recording liquids for recording yellow, magenta and yellow, respectively.

In the fourth aspect thereof, the present invention resides in a device of conducting color recording on a recording medium, and is characterized by comprising (i) a cartridge containing recording liquids, which comprises, in combination, separate containers, each of which contains the color recording liquid of the present invention having a different hue from each other, and (ii) a means for applying each recording liquid, supplied from the recording liquid container of the cartridge, to the recording medium in accordance with the desired recording pattern.

Preferably, the color recording device of the present invention is operated based on a color ink jet recording system, and the means for applying each recording liquid is an ink jet head and its accessories. The ink jet head may have any conventional constitution and can be driven upon application of heat, pressure or electrostatic attraction, for example.

Similarly, the color recording device of the present invention is preferably operated based on a color electrographic or electrophotographic system, and the means for applying each recording liquid is a hopper and the like, for example, in a development station.

Since the ink jet recording device and electrographic recording device using a liquid developer are well-known in the field of imaging and printing, the detailed descriptions thereof including the constitution and operation of the devices will be omitted herein. However, for the sake of understanding the present invention, the preferred embodiments of the present invention will be further described with reference to the color ink jet recording method and device.

Recently, color ink jet printers have become widely used as printing devices, and they are incorporated in or connected to personal computers, word processors, facsimiles, copiers, and other electronic devices. Typical printing systems in the color ink jet printers include, for example, a bubble jet (BJ) system in which the ink is vaporized upon momentary heating, thereby generating bubbles, followed by jetting and the droplets of the ink moving from nozzles appended to the ink jet head upon application of the pressure due to the bubbles, and a piezoelectric system in which droplets of the ink are jetted and travel from the appended nozzles by virtue of a pressure generated upon deformation of the piezoelectric element.

The piezoelectric system is more desirable than the bubble jet system, because the former system enables high speed printing, easy control of the printing and flexibility in selecting the ink. Various types of the piezoelectric ink jet printers have been suggested and one example of recently developed printers is provided with an ink jet head having a simplified structure, and thus capable of being produced at a low cost, which comprises an ink channel member with ink channels capable of acting as an ink channel and as a pressure-generating chamber (hereinafter, referred to as a pressure chamber), and a piezoelectric member having a surface capable of forming at least a part of the wall surface of the ink channels.

Figure 1:
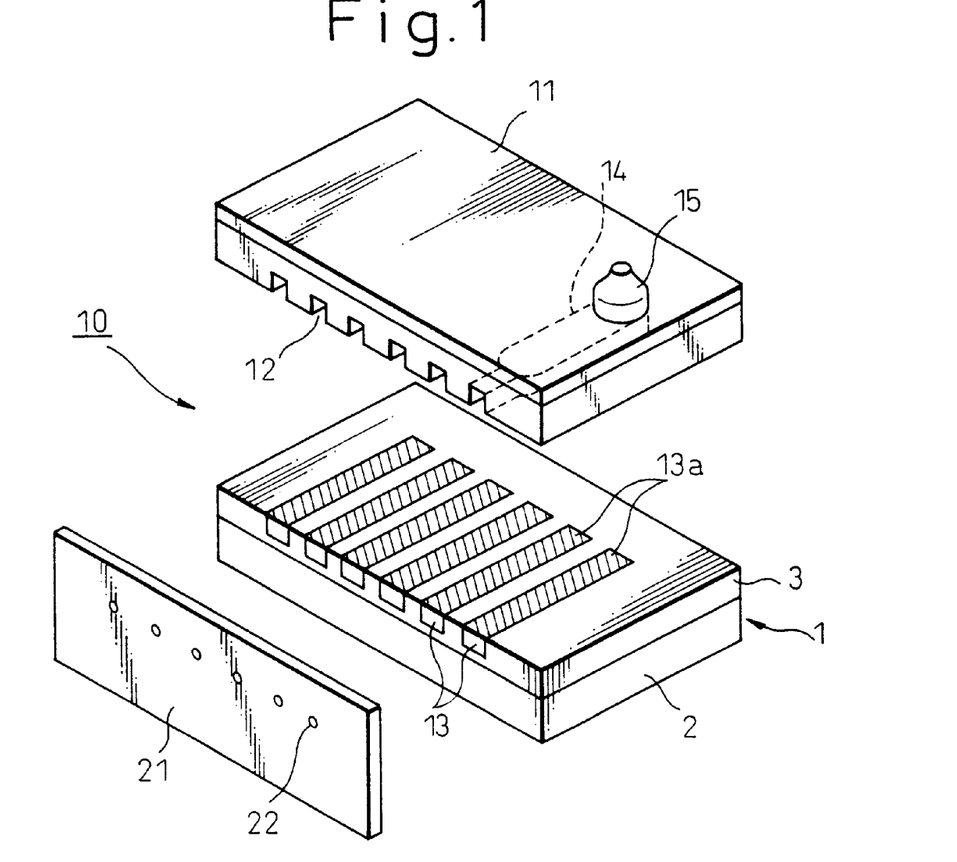
FIG. 1 is an exploded view illustrating the constitution of the ink jet head which can be used in the practice of the present invention.

FIG. 1 is an exploded view illustrating one example of the piezoelectric ink jet head which can be used in the ink jet printer according to the present invention. As is illustrated, an ink jet head 10 is mainly composed of three members or means, i.e., an ink channel member 11, a nozzle member 21 and a piezoelectric member 1. The ink channel member 11 has a plurality of ink channels 12 which can also act as a pressure chamber, in addition to the function as a conduit for guiding an ink. In the illustrated head, the ink channel member 11 has six ink channels 12. Within the ink channel member 11, ink channels 12 are collectively connected to form an ink supply conduit 14 which is then communicated with an ink supply port 15. A tip end of the ink channels 11 are also connected to a nozzle member 21 having nozzles 22 which are distributed in conformity with the distribution of the ink channels 12. The small opening of the nozzles 22 are able to jet an ink pressurized in the ink channels 12. In a side of the ink channel member 11 where the ink channels 12 are formed, a piezoelectric member 1 is attached to the whole surface of the ink channel member 11. The piezoelectric member 1 consists of a substrate 2 and a piezoelectric element 3 applied thereon. In the sites of the piezoelectric element 3 corresponding to the ink channels 12, there is fabricated a piezoelectric driver 13 which will be described in the next paragraph. Namely, a bottom surface of the ink channel member 11, which cannot be seen in the drawing, is in contact with an upper surface 13a of the piezoelectric driver 13 of the piezoelectric member 1.

Figure 2:
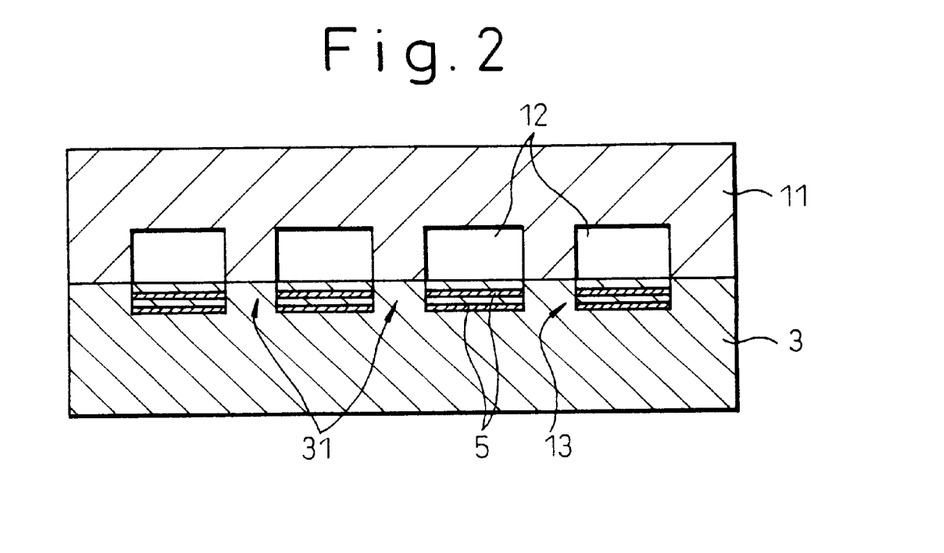
FIG. 2 is a cross-sectional view illustrating a main part of the ink jet head of FIG. 1.

FIG. 2 is a cross-sectional view explodedly illustrating a main part of the ink jet head 10. As illustrated, the piezoelectric member 1 consists of a diaphragm (not shown) serving as an oscillator to change a volume of each ink channel 12, piezoelectric elements 3 acting as a driving means for warping the diaphragm, and a pair of electrodes 5 sandwiching therebetween a piezoelectric element 3 and capable of inducing electrostriction on the piezoelectric elements 3. A pair of the electrodes, i.e., a combination of two sheets of layered electrodes 5 and one sheet of layered piezoelectric element 3 sandwiched therebetween, can be found in the illustrated instance. As a whole body, the electrodes 5 and the piezoelectric element 3 sandwiched therebetween, in combination, form a piezoelectric driver 13. Although not illustrated, the piezoelectric driver 13 may have any constitution which is generally adopted in the field of the piezoelectric ink jet head. The ink channel members 11 having ink channels 12 are bonded to the piezoelectric member 1 in such a manner that the channels 12 are butted against the piezoelectric driver 13 of the piezoelectric member 1. When a voltage is applied to between the electrodes 5 of the piezoelectric driver 13, the piezoelectric element 3 can be extended in thickness due to the generated electrostriction, thereby warping the diaphragm in contact with the piezoelectric element 3 upwardly. Due to the deformation of the diaphragm, a volume of each ink channel 12 is reduced, and thus the ink in the ink channel 12 is pressurized against an open end, i.e., opening communicating with nozzle 15, of the ink channel 12. Thus, the ink is jetted as droplets of the ink from the nozzles. Since it has a remarkably simplified constitution and requires only a small number of parts or means to complete the same, the piezoelectric. ink jet head can be produced at low cost compared to the conventional BJ ink jet heads.

Preferably, the ink channel member with ink channels used herein may be an ink channel plate which is conventionally used in the field of piezoelectric ink jet head. Namely, the ink channel member in the form of a plate can be produced from many different materials such as plastic materials, for example, PES, PET, PEN and the like; thermocurable resins; metal materials, for example, aluminum, nickel, stainless steel and the like; and photosensitive glass, for example, Photocerum (trade name) by fabricating therein the ink channels through molding or other methods such as etching, electroforming, sandblasting and laser fabrication. Alternatively, the ink channel member may be produced from light-sensitive resins or resist materials in accordance with a conventional resist process in the production of semiconductor devices. The ink channels in the ink channel member are generally constituted as a plurality of parallel, longitudinally extended grooves, and the number and size of the grooves may be widely varied depending upon various factors such as the constitution of the head. Generally speaking, it is preferred that about 4 to 60 grooves of the ink channels are formed in the ink channel member, and each ink channel has a width of about 100 to 500 $\mu$m, a depth of about 50 to 500 $\mu$m and a length of 0.1 to 20 mm.

Further, the nozzle member to be fixed to an end surface of the ink channel member may be produced so that it has a constitution similar to that of the nozzle plate of the conventional piezoelectric heads. For example, the nozzle member can be produced from a suitable plastic material, metal material and the like by using a molding or other methods as in the production of the ink channel member, and a size of the nozzle member, as well as the distribution and size of the nozzles may be widely varied depending upon the certain ink channel member used in combination with the nozzle member and other factors. Preferably, the nozzle member has a width of about 1 to 50 mm, a thickness of about 0.1 to 1 mm, and a length of about 5 to 50 mm. The nozzle member can be fixed to the ink channel member by using an adhesive agent or other means.

Furthermore, the piezoelectric member and the piezoelectric driver contained therein may be produced from, for example, a green sheet of the ceramic material designed for the production of the piezoelectric elements. A necessary number of the green sheets are laminated to obtain a desired thickness, then the laminated green sheets are calcined at an elevated temperature. Typical examples of the ceramic material which can be advantageously used in the production of the piezoelectric elements include, but are not restricted to, conventional piezoelectric elements-forming ceramic materials, for example, PNN:Pb(Ni,Nb)$O_3$-based ceramic material. Moreover, the piezoelectric element and electrode are preferably constructed of layers. Such layered electrodes, as is conventionally carried out in the production of the piezoelectric elements and electrodes, can be formed from a variety of electrically conducting materials such as metals, for example, gold, copper, nickel, palladium and the like, or alloys thereof, and conducting plastic materials. The formation of the electrodes, generally, can be carried out by producing green sheets of the piezoelectric element, followed by applying a desired pattern of the paste-like electrode material on the predetermined areas of the green sheets by means of a screen printing or other methods. The piezoelectric driver, i.e., set of the layered piezoelectric element and two layered electrodes sandwiching the same, may be introduced at any desired number into the piezoelectric member, depending upon the constitution of the ink jet head and other factors, however, generally, the number of the piezoelectric driver is preferably in the range of about 1 to 5. And, the thickness of the piezoelectric element and the thickness of the electrode, both included in the piezoelectric driver, are not restricted, however, generally, the former thickness is in the range of about 10 to 500 $\mu$m, and the latter thickness is in the range of about 0.5 to 10 $\mu$m.

Figure 3:
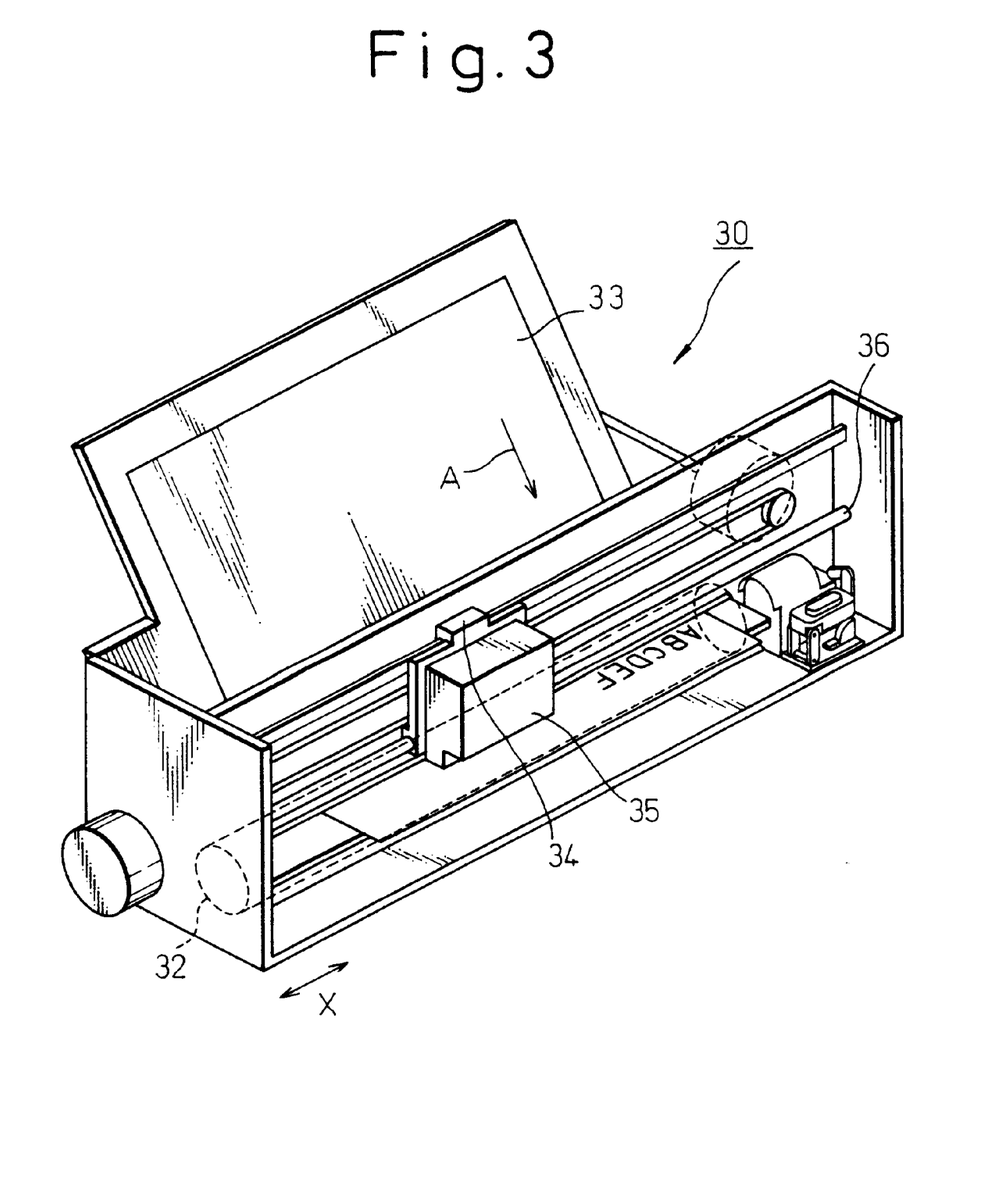
FIG. 3 is a perspective view illustrating one preferred embodiment of the color ink jet recording apparatus according to the present invention.

FIG. 3 is a perspective view illustrating a preferred embodiment of the color ink jet recording device according to the present invention. In the illustrated color ink jet recording device 30, a recording medium (plain paper) 33 is guided in the direction of the arrow "A" by means of a paper feeding roller 32. When the recording medium 33 is guided at the predetermined recording site, an ink jet head 35 having the installed ink cartridge (not shown) is scanned in the arrow "X" over the recording medium 33. The ink jet head 35 is supported by a carrier 34, and the carrier 34 is movable along a stage shaft 36.

Figure 4:
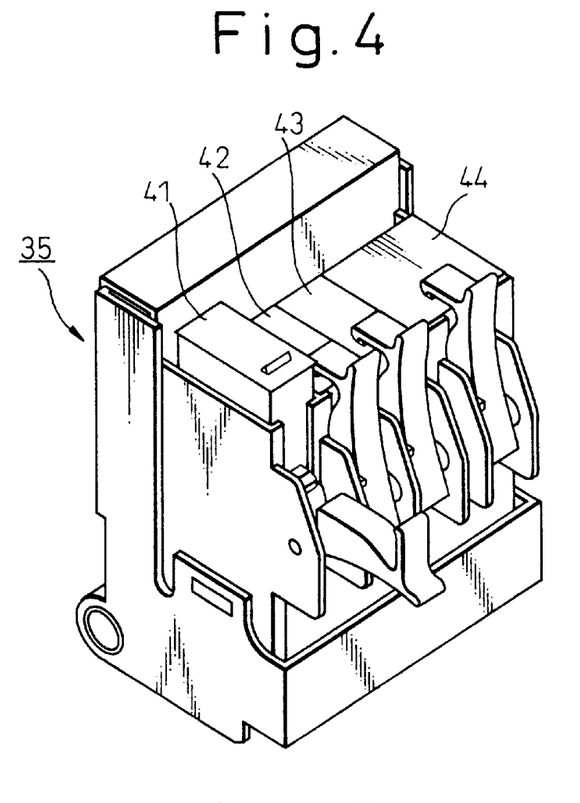
FIG. 4 is a perspective view illustrating one preferred embodiment of the recording liquid cartridge which can be used in the color ink jet recording apparatus of FIG. 3.
Figure 5:
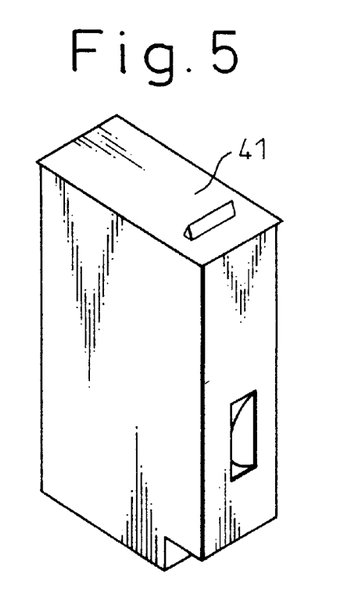
FIG. 5 is a perspective view illustrating one container to be installed in the recording liquid cartridge of FIG. 4.

FIG. 4 is a perspective view of the ink jet head having the constitution similar to that of the ink jet head of FIG. 3. The ink jet head 35, as is illustrated, has a constitution that ink cartridges 41, 42, 43 and 44 can be removably installed. In the illustrated instance, the cartridges 41, 42, 43 and 44 are designed to be charged with a yellow ink, magenta ink, cyan ink and black ink, respectively. Among these cartridges, a perspective view of the cartridge 41 for the yellow ink can be found in FIG. 5 which is incorporated for the sake of easy understanding a configuration of the ink cartridge according to the present invention.

EXAMPLES

The present invention will be further described with reference to some non-restrictive working examples thereof. Note that the amount "parts" frequently referred to herein means "parts by weight", unless otherwise specified.

As described above in detail, since the colored particles of ionic group-containing polyester resin can be prepared as an aqueous dispersion having different average particle diameters of not more than about 0.3 $\mu$m and a narrow distribution of particle size, and also in the preparation thereof, the resin particles can be colored with any dyes and/or pigments which are insoluble in water at an ordinary temperature, a range of selecting the coloring material can be widened, thus enabling use of coloring materials having excellent properties. However, it should be noted in the selection of the dyes or pigments that the pigments generally have an excellent water resistance and lightfastness, but when used in color recording, they can show only insufficient brightness in addition to a narrowed range of color reproduction, whereas the dyes can exhibit an excellent brightness and a widened range of color reproduction in color recording, but they, including black dyes, show poor water resistance and lightfastness. In addition, in selecting the ionic group-containing polyester resin, either of an anionic group and cationic group may be contained in the resin.

From these circumstances, it is contemplated that an ink which contains the colored particles of ionic group-containing polyester resin as the coloring material (the ink is generally referred to as a "polymer ink") is preferably used as a color ink and in the preparation thereof, dyes are preferably used as the coloring agent. Namely, as a result of coloring the polyester resin with the dyes, printing can be carried out with a high brightness and widened color reproduction, and a water resistance can be improved, because the water-insoluble polyester resin is colored with the water-insoluble dyes. Also, a lightfastness can be improved, because the polyester resin can effectively absorb ultraviolet radiations which can cause undesirable change of the color in the dyes contained therein.

On the other hand, in the preparation of a black ink, if it is desired to avoid clogging of the nozzles of the ink jet head and improve a storage stability, water-soluble dyes are preferably used as the coloring agent, and if it is desired to obtain a high water resistance and lightfastness, the colored polyester resin is preferably used as the coloring material or alternatively pigments such as carbon black are preferably used as the coloring agent. If desired, these coloring agents may be used as a mixture of two or more agents.

Thus, in the working examples which will be described below, the polymer ink is used as the color ink in order to fully obtain excellent characteristics of the polymer ink, and each of the dye ink, pigment ink and polymer ink is used as the black ink.

Preparation of Polymer Ink

Polymer inks were prepared by using the below-mentioned dyes as the coloring agent in accordance with the methods described in Japanese Unexamined Patent Publication (Kokai) No. 4-296321 (preparation of an aqueous dispersion of the polyester resin particles colored with the dye) and Japanese Unexamined Patent Publication (Kokai) No. 7-196965 (production of ink jet inks).

A copolymerized polyester resin (1) was prepared by the ester interchange reaction of the following composition:

| | |
|---|---|
| dimethyl terephthalate | 290 parts |
| ethylene glycol | 109 parts |
| neopentyl glycol | 180 parts |
| 2-dimethylaminomethyl, 2-methyl-1,3-propanediol | 15 parts |
| tetrabuthoxy titanate | 0.2 parts |

Similarly, a copolymerized polyester resin (2) was prepared by the ester interchange reaction of the following composition:

| | |
|---|---|
| dimethyl terephthalate | 130 parts |
| dimethyl isophthalate | 56 parts |
| dimethylester of 5-sodium sulfoisophthalic acid | 6 parts |
| ethylene glycol | 159 parts |
| neopentyl glycol | 268 parts |
| tetrabuthoxy titanate | 0.1 parts |

Four types of the following dyes were provided as the coloring agent.

| | |
|---|---|
| C.I. Solvent Yellow 162 | 4 parts |
| C.I. Disperse Red 92 | 8 parts |
| C.I. Solvent Blue 64 | 6 parts |
| C.I. Solvent Black 3 | 15 parts |

100 parts of the copolymerized polyester resin (1) or (2) and each of the above-described dye in the described amount were dissolved in a mixture of the following solvents:

| | |
|---|---|
| methyl ethyl ketone | 175 parts |
| tetrahydrofuran | 175 parts. |

Then, 600 parts of water was added to the mixture, followed by thorough stirring. Four aqueous dispersions of the differently colored polyester resin particles each containing an cationic or anionic group were thus obtained. The dispersions were filtered on a membrane filter having a pore size of 0.8 μm. After each filtrate was distilled, an aqueous dispersion of the colored polyester resin particles having a solid content of 30% by weight and an average particle diameter of about 0.20 μm (cationic group-containing resin particles) or about 0.18 μm (anionic group-containing resin particles) was obtained.

A polymer ink was prepared by using each of the thus obtained aqueous dispersions of the colored polyester resin particles. The aqueous dispersion as a coloring material was thoroughly mixed with glycerin as a wetting agent, ethanol and water as a penetration controlling agent, and for the preparation of yellow, magenta and cyan color inks, a nonionic surfactant as a penetrating agent. The polymer inks thus obtained are classified into the following two groups (A) and (B), and each has similar characteristics.

(A) Polymer inks A-K(black), A-Y(yellow), A-M (magenta) and A-C(cyan)

Four colored ink jet inks containing particles of the colored polyester resin containing a cationic group.

Viscosity: about 4 to 5 cP surface tension: about 54 dyn/cm (black ink); about 32 dyn/cm (color inks).

(B) Polymer inks B-K(black), B-Y(yellow), B-M (magenta) and B-C(cyan)

Four colored ink jet inks containing particles of the colored polyester resin containing an anionic group.

viscosity: about 4 to 5 cP surface tension: about 54 dyn/cm (black ink); about 32 dyn/cm (color inks).

In these ink jet inks, a solid content thereof was about 24% by weight (black, yellow and magenta-inks) and about 15% by weight (cyan ink).

Preparation of Non-Polymer Inks (Pigment Inks and Dye Inks)

(1) Preparation of Pigment Inks

Pigment inks were prepared by using the pigments as the coloring agent in accordance with the methods described in Japanese Examined Patent Publication (Kokoku) No. 8-19361 and Japanese Unexamined Patent Publication (Kokai) No. 3-210373. Note that Japanese Kokoku 8-19361 teaches the preparation process of the cationic group-containing pigment dye by using carbon black as a coloring agent and the copolymeric resin as a dispersing agent, and Japanese Kokai 3-210373 teaches the preparation process of the anionic group-containing pigment dye by using acidic carbon black as a coloring agent and the copolymeric resin as a dispersing agent. The following is a brief description concerning the preparation of the pigment inks.

An aqueous dispersion (1) of the cationic group-containing pigment was prepared by adding the following components:

| | |
|---|---|
| carbon black | 15 parts |
| ethanol | 5 parts | to a solution of the following composition:

| | |
|---|---|
| copolymer of styrene, butyl acrylate and methacrylic acid | 4.5 parts |
| monoethanol amine | 1 part |
| water | 65 parts |
| ethylene glycol | 5 parts. |

After the carbon black was finely and uniformly dispersed in the mixed solution, coarse particles were removed from the solution to obtain the target aqueous dispersion (1).

Similarly, an aqueous dispersion (2) of the anionic group-containing pigment was prepared by adding the following components:

| | |
|---|---|
| acidic carbon black | 15 parts |
| ethanol | 5 parts | to a solution of the following composition:

| | |
|---|---|
| copolymer of styrene, half ester of maleic acid and anhydrous maleic acid | 5 parts |
| triethanol amine | 3 parts |
| water | 67 parts |
| ethylene glycol | 5 parts. |

After the acidic carbon black was finely and uniformly dispersed in the mixed solution, coarse particles were removed from the solution to obtain the target aqueous dispersion (2).

A pigment ink was prepared by using each of the thus obtained aqueous dispersions (1) and (2) of the pigment as a coloring material. The aqueous dispersion of the pigment was thoroughly mixed with diethylene glycol as a wetting agent, water as a penetration controlling agent, and for the case using the aqueous dispersion (2) of the pigment as a coloring material, a monoethanolamine as a pH controlling agent. The pigment inks thus obtained are classified into the following two groups (A) and (B), and each has similar characteristics.

(A) Black pigment ink (A) containing a cationic group.
viscosity: about 3 cP
surface tension: about 45 dyn/cm.
(B) Black pigment ink (B) containing an anionic group.
viscosity: about 3 cP
surface tension: about 45 dyn/cm.

(2) Preparation of Dye Inks

Dye inks were prepared by using the dyes as the coloring agent in accordance with the methods described in Japanese Unexamined Patent Publication (Kokai) No. 64-58583. Note that Japanese Kokai 64-58583 teaches the preparation process of both of the cationic group-containing dye ink containing a basic dye as a coloring agent and the anionic group-containing dye ink containing an acid dye as a coloring agent. The following is a brief description concerning the preparation of the dye inks.

The following components:

| | |
|---|---|
| basic dye (C.I. Basic Black 2) | 3 parts |
| diethylene glycol | 8 parts |
| ethanol | 6 parts |
| water | 83 parts | were mixed and the resulting solution was filtered on a membrane filter having a pore size of 0.45 μm. A cationic group-containing black dye ink A having a viscosity of about 2 cP and a surface tension of about 53 dyn/cm was thus obtained.

Similarly, the following components:

| | |
|---|---|
| acid dye (C.I. Acid Black 2) | 3 parts |
| diethylene glycol | 8 parts |
| ethanol | 6 parts |
| sodium hydroxide | 0.1 parts |
| water | 82.9 parts | were mixed and the resulting solution was filtered on a membrane filter having a pore size of 0.45 μm. An anionic group-containing black dye ink B having a viscosity of about 2 cP and a surface tension of about 54 dyn/cm was thus obtained.

Printing Tests

The polymer inks as well as the pigment inks and dye inks which were prepared as described in the above preparation examples were each contained in an ink cartridge, and were combined to obtain different sets of recording liquids (namely, black ink plus color inks). Each set of recording liquids was installed on a color ink jet printer, MJ-800C commercially available from Seiko-Epson Co. and both the character patterns and the solid patterns were printed out on the recording papers. The recording papers used are conventional plain papers for dry process copiers, Xerox 4024 DP commercially available from Xerox Co. in the USA. Printing was made at the resolution of 360 dpi. The amount of the jetted ink was about 90 to 100 pL per one droplet of ink for the black ink and about 50 pL per one droplet of ink for the color inks. The character patterns were printed out by using black inks and three color inks separately, and the solid patterns were printed out as a grid pattern in which different color areas are adjacent to each other, by using seven colors, i.e., black (K), yellow (Y), magenta (M) and cyan (C) as well as red, green and bluish violet obtained by the combination of Y, M and C.

The obtained test samples of the character and solid patterns were then visually evaluated with regard to an extent of blurring of ink in the printing of the character patterns and a presence or absence of color bleeding in a borderline between two different colors. The results of the evaluation are summarized as follows.

Printing of Character Patterns:

Using the black inks, sharp character prints having only a negligible amount of blurring could be obtained in all printing tests. Using the color inks, an amount of the blurring were increased in comparison with the black inks, however, a deterioration of the printing qualities due to increase of the blurring could be inhibited to an inconspicuous level, because a contrast in color between the recording papers and the color inks is smaller than that of between the papers and the black inks.

Printing of Solid Patterns:

Sharp and bright prints could be obtained when the color inks were used. Further, high quality printing could be obtained, because bleeding of color could be effectively prevented at a border between two different color inks including secondary colors (red, green and bluish violet) produced upon additive mixing of Y, M and C. On the other hand, at a border between the black ink and anyone of the color inks, an increase of bleeding could not be prevented because of a flow of the black ink into the adjacent color ink area when the black ink and the color ink have the same ionic group, although such increase of bleeding could be inhibited if the black ink and the color ink have opposed ionic groups, i.e., one ink contains a cationic group, while another one an anionic group. The tendency of generating bleeding was further increased at a border between the black ink and the secondary color ink.

Following the above-described printing tests, the obtained prints in black and color of the solid patterns were subjected to a test for evaluating a water resistance in which the prints were dipped in water one day after completion of the printing. Good water resistance could be confirmed for the prints using the polymer inks and pigment inks, because a substantial amount of the inks could be retained on the recording papers without flowing on its surface. Contrary to this, for the prints using the black dye inks, some of the inks were dissolved in water from the printed areas and flowed over the areas, thereby causing whitening of the printed areas, along with stain formation in the non-printed areas because of migration of the inks from the printed areas to the non-printed areas.

The obtained prints in black and color of the solid patterns were further subjected to a test for evaluating a lightfastness in which the prints were exposed to ultraviolet radiations at an exposure energy of 3200 kJ/cm$^2$ from a xenon light source. Remarkably large change of color was observed in the prints obtained using the dye inks, whereas only a minor change of color was observed in the prints of the polymer inks, and no change of color was observed in the prints of the pigment inks.

Furthermore, the above procedure concerning solid pattern printing was repeated by using four colored ink jet inks which were prepared from the particles-of colored anionic group-containing polyester resin, i.e., the above-mentioned color polymer inks B-K, B-Y, B-M and B-C, as the coloring material. The solid patterns were repeatedly printed out with different inks on the same recording paper. A gloss was generated in a surface of the prints with increase of the number of the repeated printing steps, and thus a visual brightness of the prints was increased along with increased printing qualities. In other words, the above results indicate that use of the polymer inks in the printing enables generation of a gloss in the print surface, and a level of the gloss can be increased with increase of the amount of the polyester resin received on the recording papers, and that particularly such generation of the gloss is important in the color printing exclusive of black printing, because it can improve a visual brightness as a function of the gloss in the print surface, thereby enabling high quality printing. In practice, only a minor level of gloss was obtained in one step printing using the polymer ink B-Y, B-M or B-C, however, its level could be remarkably increased with an increase of the printing steps. For example, remarkable gloss could be obtained on the print surface after two or more printing steps for the yellow and magenta printing, and after three or more printing steps for the cyan printing. Although it has not been completely clarified, it is considered that the above desirable results may partly rely upon an unevenness of the surface of the recording papers used.

The following is the inventors' conclusion derived from the above-described results of the evaluation tests.

During ink jet printing, one droplet of the ink jetted from the ink jet head has a volume of about 50 pL and a specific gravity of about 1.02, and a content of the resin per one ink droplet is about 12.2 ng for the yellow and magenta inks and about 7.65 ng for the cyan ink. Since, as mentioned above, a series of ink droplets were jetted to obtain a resolution of 360 dpi, an average print area owing to the one ink droplet amounts to 70.6×70.6 $\mu$m$^2$. Assuming that the above print area is occupied with the resin particles as a layer, i.e., under the most intimately distributed conditions, when the resin particles used have an average diameter of 0.18 $\mu$m, it is calculated that the number of the resin particles necessary to coat the print area is about 1.78×10$^5$.

On the other hand, the resin contained in the ink has a specific gravity of about 1.3 and a weight of the resin particles having a diameter of 0.18 $\mu$m is about 3.05×10$^{-6}$ ng per one particle. Thus, it is calculated from this particle weight and the above-mentioned resin content per one ink droplet that the number of the resin particles contained per one ink droplet in the yellow and magenta inks is about 4×10$^6$ and that of the ink droplet in the cyan ink is about 2.51×10$^6$.

Accordingly, when one ink droplet described above is jetted on the print area of 70.6×70.6 $\mu$m$^2$ so that the resin particles are distributed like the closest packing in the resulting ink layer, it is calculated from the above-described number of the resin particles per one ink droplet and the number of the resin particles necessary to coat the print area that the printed yellow and magenta inks contain about 22.5 layers of the resin particles, and thus a layer thickness of about 3.53 $\mu$m, and the printed cyan ink contains about 14.1 layers of the resin particles, and thus a layer thickness of about 2.22 $\mu$m.

As described above, if a satisfactory gloss must be generated in the resulting color prints, at least two printing steps must be repeated for the yellow and magenta inks, and at least three printing steps must be repeated for the cyan ink. Thus, in order to generate a satisfactory gloss in the color prints, it is necessary to apply the yellow and magenta inks in an amount sufficient to obtain a thickness of particle layer of at least about 3.5 $\mu$m, preferably at least about 7 $\mu$m, and the cyan ink in an amount sufficient to obtain a thickness of particle layer of at least about 4.5 $\mu$m, preferably at least about 7 $\mu$m, respectively.

Accordingly, when the plain papers for dry process copiers are used as the recording papers, a gloss in the prints can be improved with increase of the content of the resin in the ink printed on the papers, and in order to obtain a gloss, it is desired to control a resin content in the printed ink to a level sufficient to obtain a thickness of particle layer of about 4.5 μm or more, more preferably, about 7 μm or more. However, in the control of the resin content in the printed ink, an excess increase of the resin content must be avoided, because when such a content is excessively increased for the one step printing process, an increased amount of the resin deteriorates a resistance to clogging and a storage stability, and also results in an increase of the viscosity of the ink which will then adversely affect the jetting of the ink from the nozzles, and an increase of the amount of the ink droplet which will deteriorate frequency characteristics of the droplet formation. Further, for the multiple step printing process, when the resin content is excessively increased, there arises a problem that a printing time is extended as a result of increase of the steps necessary to conduct the printing.

Particularly, it should be noted that the present invention can exhibit its excellent functions and effects when the present invention is applied to the color recording processes using so-called "plain papers" having exposed fibers on a surface thereof. This is because blurring and bleeding of color are generally caused when the recording papers used have an uneven surface due to random orientation of the fibers and others, and the plain papers have a large tendency of causing blurring and bleeding of color because of the exposed fibers.

As will be now appreciated from the above-described details of the present invention, according to the present invention, it becomes possible to conduct black recording with high qualities without causing any blurring, and also conduct color recording with high qualities without causing any bleeding of color in a border between the two adjacent color recording areas including black recording area. The present invention is also able to obtain an excellent water resistance and lightfastness in the recordings, and give an excellent brightness and a widened color reproduction in the color recording.

Particularly, according to the present invention, since the polymer inks are used as the color inks, i.e., inks for color recording, and three, i.e., yellow, magenta and cyan inks are used as the color inks, it becomes possible to simultaneously attain both of an highly increased water resistance and lightfastness and an excellent brightness and color reproduction, contrary to the conventional aqueous inks based on the dyes or pigments which are unable to provide these advantages.

In addition, according to the present invention, since an amount of the polymer inks used in color recording is controlled so that it may satisfy the requirements concerning a predetermined minimum content of the resin in the printed ink on the recording papers, it becomes possible to obtain a high chroma and color development and give a gloss onto a surface of the recordings, thereby ensuring a high brightness and qualities.

What is claimed is:

1. A recording liquid for use in color recording which comprises, in combination, (a) an aqueous, black-colored recording liquid and (b) at least one aqueous, colored recording liquid which has other hue than black, in which said colored recording liquid (b), when applied to a recording medium, can be fixed in said recording medium within a shorter time than the time required when said black-colored recording liquid (a) is fixed in the same recording medium, said colored recording liquid (b) is a recording liquid which comprises water having dispersed therein a coloring material consisting of particles of ionic group-containing resin dispersed and colored with at least one selected from the group consisting of a dye and a pigment, and is used as a first recording liquid, said black-colored recording liquid (a) is a second recording liquid which comprises water having dispersed and/or dissolved therein a coloring material consisting of an ionic group-containing compound whose ionic group has an opposite ionic character to that of the ionic group of said ionic group-containing resin, said coloring material of the second recording liquid being at least one member selected from the group consisting of a dye, a pigment, and resin particles colored with at least one selected from the group consisting of a dye and a pigment.

2. A recording liquid according to claim 1, in which said ionic group-containing resin is a polyester resin containing an ionic group in a molecule thereof.

3. A recording liquid according to claim 1, in which said first recording liquid comprises three types of aqueous colored recording liquids, each of which is designed to make a cyan, magenta or yellow color, respectively.

* * * * *